May 30, 1950  F. K. BRAINARD ET AL  2,510,045
CONTROL SYSTEM FOR STARTING MULTIPLE
SPEED SYNCHRONOUS MOTORS
Filed July 14, 1949  2 Sheets-Sheet 1

INVENTORS
FRANK K. BRAINARD, DECEASED
WILLIAM M. KITTSON, EXECUTOR
WILLIAM L. RINGLAND

BY T. Lloyd La Grave
ATTORNEY

May 30, 1950  F. K. BRAINARD ET AL  2,510,045
CONTROL SYSTEM FOR STARTING MULTIPLE
SPEED SYNCHRONOUS MOTORS
Filed July 14, 1949  2 Sheets-Sheet 2
| FIELD COIL GROUP | 1 | 2 | 3 | 4 | 1 | 2 | 3 | 4 |
|---|---|---|---|---|---|---|---|---|
| N-POLE POLARITY | N | S | S | N | N | S | S | N |
| 2N-POLE POLARITY | N | S | N | S | N | S | N | S |
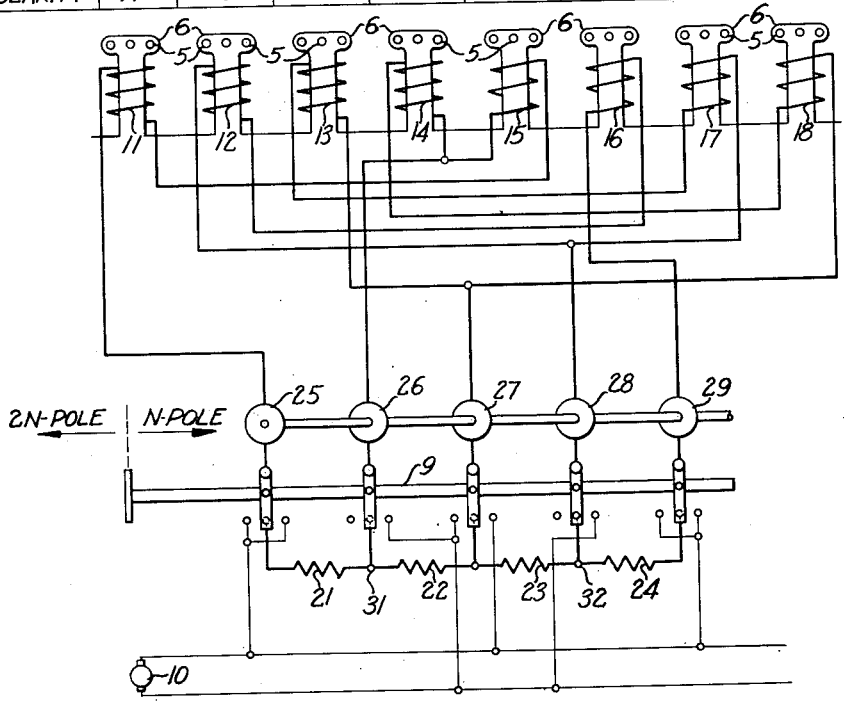
FIG. 4
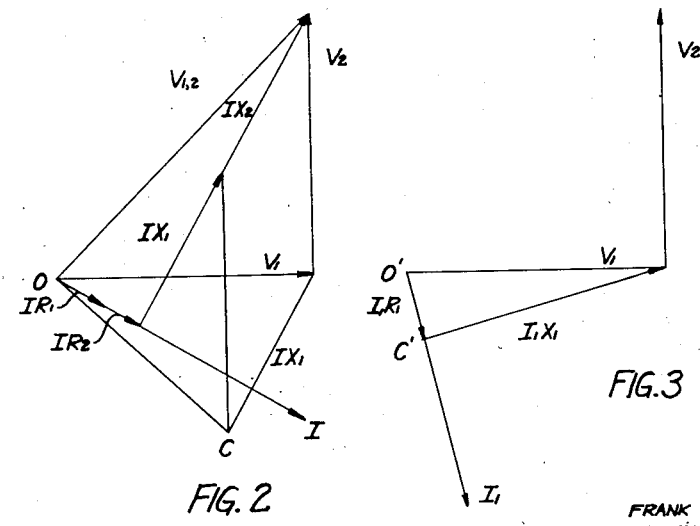
FIG. 2
FIG. 3
INVENTORS
FRANK K. BRAINARD, DECEASED
WILLIAM M. KITTSON, EXECUTOR
WILLIAM L. RINGLAND
BY
ATTORNEY

Patented May 30, 1950

2,510,045

UNITED STATES PATENT OFFICE 2,510,045

CONTROL SYSTEM FOR STARTING MULTIPLE SPEED SYNCHRONOUS MOTORS

Frank K. Brainard, deceased, late of Wauwatosa, Wis., by William M. Kittson, executor, West Allis, Wis., and William L. Ringland, West Allis, Wis., assignors to Allis-Chalmers Manufacturing Company, Milwaukee, Wis., a corporation of Delaware Application July 14, 1949, Serial No. 104,666

6 Claims. (Cl. 318—173)

This invention relates to a control system for starting a dynamoelectric machine of the synchronous type operable at two or more synchronous speeds and more particularly to the circuit arrangement of the field winding of the machine.

It is the general practice to connect the field coils of a two speed synchronous motor in separate groups consisting of alternate pairs of adjacent coils. The coils of each pair are connected in series but the connections of one of the coils may be reversed to produce a north or a south pole when the field system is excited for forming either N or 2N poles. During the 2N pole (low speed) starting period, the voltage induced by the armature flux in each coil of the series connected pair is largely offset by the reactance drop produced in the coil by the induced field current. However, during the N pole (high speed) starting period these coils are 90 electrical degrees apart with respect to the armature magnetomotive force and have voltages induced in them 90 degrees out of phase. The common induced field current is close to 90 degrees out of phase with the resultant of the coil voltages and therefore close to 45 or 135 degrees out of phase with each individual coil voltage. Therefore, the induced voltage in each coil is only partly offset by the reactive drop of the induced field current, and the coil terminal voltages may reach such magnitude as to be dangerous to the insulation of the winding.

This disadvantage is obviated by the invention described herein, which provides that all the field coils similarly situated with respect to the armature magnetomotive force during either the N pole or 2N pole starting period are serially connected in a single circuit between two collector rings.

It is therefore an object of the invention to provide an improved control system for starting a multiple speed synchronous motor in which the voltage appearing across each field coil is substantially reduced during the starting period when the armature is connected for high speed.

Other objects and advantages will be apparent from a consideration of the following description taken in connection with the accompanying drawing, in which:

Fig. 1 diagrammatically illustrates an embodiment of a control system for a two speed synchronous motor embodying the invention;

Fig. 2 illustrates vectorially the relation of the voltages and currents of a group of coils connected in series during the N pole starting period in a system of the prior art;

Fig. 3 illustrates vectorially the voltages and currents obtained when the group of coils is connected in accordance with the present invention; and Fig. 4 diagrammatically illustrates another embodiment of the control system in accordance with the present invention.

Figure 1:
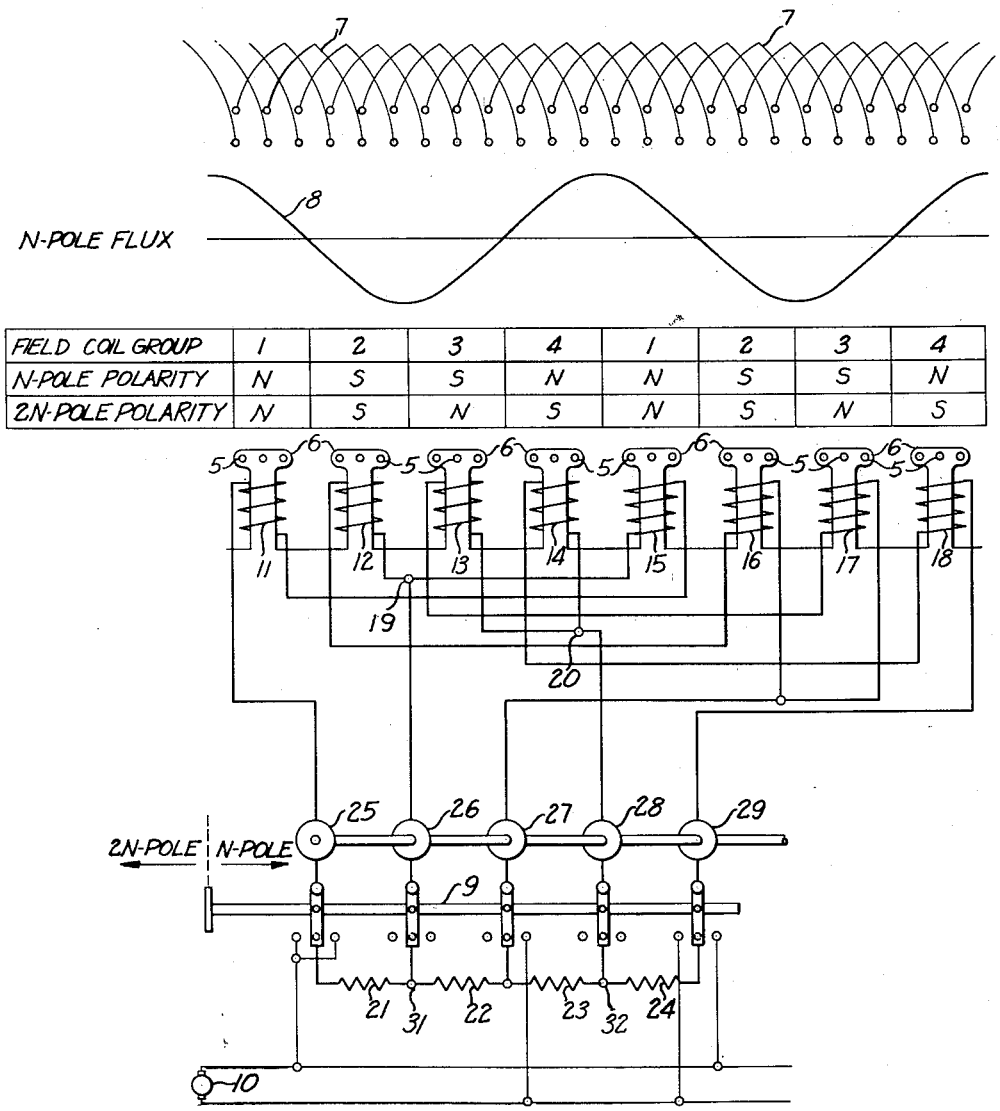

Referring to the drawing, numeral 6 indicates the salient polar projections of a two speed synchronous motor. These polar projections, which are diagrammatically represented as developed in a straight line, may number four or any multiple thereof, such as eight polar projections as shown.

The field coils 11 to 18 are connected across four suitable discharge resistors 21 to 24 through slip rings 25 to 29 when starting the synchronous motor. As shown at least five slip rings are necessary to connect the coils to at least five points of the discharge resistors. A source of excitation current is shown as a direct current exciter 10 which may be connected to the field winding through a suitable field switch 9 after the motor has completed starting, so that either alternate coils produce north and south poles, or alternate pairs of coils produce pairs of north and south poles.

The winding is divided into four groups of coils. The coils of each group are connected in series between two collector rings and when excited produce poles of the same polarity. Within each group the coils are wound on polar projections which are similarly situated with respect to the stator magnetic field whether the stator field forms N or 2N poles. These polar projections of each group are 360 electrical degrees apart when the stator field forms N poles as shown by curve 8.

A first group of coils 11 and 15 when excited for either speed produces north poles. A second group of coils 12 and 16 produces south poles when excited for either speed. A third group of coils 13 and 17 produces north poles when excited for low speed, and produces south poles when excited for high speed. A fourth group of coils 14 and 18 produces south poles when excited for low speed and north poles when excited for high speed. The polar projections are provided with a damper winding 5 which enables the machine to start as an induction motor as is well known.

The armature winding 7 of the synchronous motor is polyphase of any number of phases and is wound in any suitable known manner so that it may be connected to a supply line (not shown) for forming either N or 2N poles, where N is an even integer. The synchronous motor represented is assumed to be of the revolving pole type, and the armature winding therefore is referred to as the stator winding. However, the motor could as well comprise a rotating armature and a fixed field pole structure.

The revolving magnetic field produced at a given instant when the stator winding is excited and connected for forming N poles for operating at high speed is represented by curve 8.

When starting the synchronous motor, the switch 9 is in a first position shown, whereby the discharge resistors are connected across the four groups of field coils, center tap 19 of the first and second groups of coils being connected to the juncture 31 of resistors 21, 22 and center tap 20 of the third and fourth groups of coils being connected to the juncture 32 of resistors 23, 24.

The stator winding being excited and connected for 2N poles for low speed operation, the machine approaches synchronous speed as an induction motor; the field switch 9 may then be actuated to the left, to a second position, to connect exciter 10 to the groups of field coils so that the four groups of coils are connected in series in one circuit. The flow of current through each of the groups has the required direction to produce 2N poles in the revolving field. The motor may then pull into step and operate synchronously at low speed.

To operate at high speed, the motor is preferably started as described above with stator winding connected for low speed. The motor, operating as an induction motor with the discharge resistors connected across the groups of field coils approaches low synchronous speed. The field coils again are excited to cause the motor to pull in at low synchronous speed. Then the stator winding is disconnected from the supply line, the switch is returned to the position shown to reconnect the discharge resistors to the field coils, and the stator winding is reconnected to the line to form N poles instead of 2N poles. The motor accelerates further as an induction motor and, when it approaches high synchronous speed, the field switch 9 may be actuated to the right, to a third position, to disconnect the discharge resistors and to connect exciter 10 to the winding so that the groups of coils are connected in two parallel circuits to produce N effective poles in the revolving field. The magnitude of the coil excitation current is thus doubled, and the direction of flow of excitation current in only the third and fourth groups of coils is reversed with respect to the direction of current therein when the field was excited for producing 2N poles. The motor may then pull into step and operate synchronously at high speed.

During the second accelerating period of the N pole starting operation, the adjacent polar projections are 90 electrical degrees apart with respect to the rotating magnetic field. This is illustrated by curve 8, one cycle of the curve corresponding to four polar projections. The voltages induced in the coils 11, 15 of group one are in phase with each other and are represented as a single voltage vector $V_1$ in Figs. 2 and 3. The voltages induced in the coils 12, 16 of group two are in phase with each other, and are represented as a single voltage vector $V_2$, 90 degrees out of phase with vector $V_1$.

First assuming tap 19 is not connected to the juncture of resistors 21, 22, as was the practice heretofore, the adjacent pairs of coils of groups one and two form a single series circuit with resistors 21, 22.

The resultant induced voltage $V_{1,2}$ in this series circuit is the vector sum of voltages $V_1$ and $V_2$ induced in the two groups of coils. The resultant induced voltage produces a lagging current I which flows through the series connected groups of coils of reactances $X_1$ and $X_2$ respectively. The resultant induced voltage $V_{1,2}$ is equal to the vectorial sum of the reactance drops $IX_1$ and $IX_2$ in the two groups of coils and of the voltage drops $IR_1$ and $IR_2$ in resistors 21 and 22, respectively, the resistance of the coils being negligible. The induced voltages $V_1$ and $V_2$ being assumed to be equal, it can readily be shown that the reactance voltage $IX_1$ is close to 45 degrees out of phase with its induced voltage $V_1$. The actual voltage appearing across the coils of group one is the vectorial difference of the induced voltage $V_1$ and the reactance voltage $IX_1$. This difference, shown in Fig. 2 as OC, is comparable to the induced voltage $V_1$ and is much greater than the voltage between the slip rings 26, 27, which is the sum of the resistance drops $IR_1$ and $IR_2$.

However, in accordance with the present invention, during the N pole starting period, center tap 19 is connected to the juncture 31 of discharge resistors 21, 22 to form two functionally independent circuits, one circuit including the coils of group one and resistor 21, the other circuit including the coils of group two and resistor 22. The induced voltage $V_1$ causes current $I_1$, vectorially shown in Fig. 3, to flow in one circuit. $I_1$ lags $V_1$, and the reactance voltage $I_1X_1$ is close to being equal and opposite to the induced voltage $V_1$. The actual voltage $O^1C^1$ across the coils of group one is now equal to only the voltage drop $I_1R_1$ in resistor 21, and is therefore much lower than it would be without the connection between point 19 and the juncture 31 of resistors 21, 22. Similar conditions prevail in the coils of the other three groups.

The control system illustrated in Fig. 4 has the discharge resistors connected across the field coils as described with respect to the control system illustrated in Fig. 1. However, the excitation current is supplied to the coils connected in two parallel circuits for operating at low speed, and the excitation current is supplied to the coils connected in four parallel circuits for operating at high speed. The first and fourth groups of coils are series connected in one circuit, and, in parallel therewith, the second and third groups of coils are series connected in another circuit to the source of excitation current for operating at low speed when the switch 9 is actuated to the left, to the second position. The groups of coils are connected in four separate parallel circuits, when the switch 9 is actuated to the right, to the third position, for operating at high speed.

Although but two embodiments of the invention have been shown and described, it will be apparent to those skilled in the art that the control system is applicable to a generator reconnectable for different number of poles and to a motor with other than two to one speed ratio, and that other various changes and modifications may be made to the embodiments without departing from the spirit of the invention or from the scope of the appended claims.

It is claimed and desired to secure by Letters Patent:

1. In combination, a synchronous dynamoelectric machine comprising an armature and a field structure having polar projections provided with field coils to be connected to form alternately N or 2N magnetic poles where N is an even integer, a source of excitation current for energizing said coils, said coils being divided into four groups, all the coils of each group interconnected to produce poles of the same polarity which are 360 electrical degrees apart with respect to said armature when said motor operates with N poles, four discharge resistors, switching means actuable into three positions, and means connecting said switching means to said source, said coils and at least five points of said resistors, whereby said switching means, when actuated into a first position, connect said resistors and said groups of coils in four circuits each comprising one of said resistors and one of said groups of coils in series for starting said motor, said switching means when actuated into a second position connect said groups of coils to said source of excitation current so that a first and fourth said groups of coils are connected in series in one circuit and a second and third said groups of coils are connected in series in another circuit, said first and third said groups of coils provide north poles and said second and fourth said groups of coils provide south poles for operating said motor with 2N poles, and said switching means when actuated into a third position connect said coils to said source so that said first and fourth groups of coils provide north poles and said second and third said groups of coils provide south poles, for operating said motor with N poles.

2. In combination, a two speed synchronous dynamoelectric machine comprising an armature and a field structure having polar projections provided with four field coils to be connected to form alternately two or four magnetic poles, a source of excitation current for energizing said coils, four discharge resistors, switching means actuable into three positions, and means connecting said switching means to said source, said coils and at least five points of said resistors whereby said switching means, when actuated into a first position, connect said resistors and said coils in four circuits each comprising one of said resistors and one of said coils in series for starting said motor, said switching means when actuated into a second position connect said coils to said source so that adjacent coils form poles of opposite polarity for operating said motor at the lower speed, said switching means when actuated into a third position connect said coils to said source so that adjacent pairs of coils form pairs of poles of opposite polarity for operating said motor at the higher speed.

3. In combination, a two speed dynamoelectric machine comprising an armature and a field structure having polar projections provided with field coils to be connected to form alternately N or 2N magnetic poles where N is an even integer, a source of excitation current for energizing said coils, said coils being divided into four groups, all the coils of each group interconnected to produce poles of the same polarity which are 360 electrical degrees apart with respect to said armature when said motor operates with N poles, four discharge resistors, switching means actuable into three positions, and means connecting said switching means to said source, said coils and at least five points of said resistors, whereby said switching means, when actuated into a first position, connect said resistors and said groups of coils in four circuits each comprising one of said resistors and one of said groups of coils in series for starting said motor, said switching means when actuated into a second position connect said groups of coils to said source of excitation current so that the direction of flow of said current in each said groups of coils is in one direction for operating with 2N poles, said switching means when actuated into a third position connect said groups of coils to said source of excitation current so that the direction of flow of said current through two said groups of coils is reversed for operating with N poles.

4. In combination, a two speed synchronous dynamoelectric machine comprising an armature and a field structure having polar projections provided with field coils to be connected to form alternately N or 2N magnetic poles where N is an even integer, a source of excitation current for energizing said coils, said coils being divided into four groups, all the coils of each group interconnected to produce poles of the same polarity which are 360 electrical degrees apart with respect to said armature when said motor operates with N poles, four discharge resistors, switching means actuable into three positions, and means connecting said switching means to said source, said coils and at least five points of said resistors, whereby said switching means, when actuated into a first position, connect said resistors and said groups of coils in four circuits each comprising one of said resistors and one of said groups of coils in series for starting said motor, said switching means when actuated into a second position connect said groups of coils to said source so that said current flows in a given direction through a first and a fourth said groups of coils in series in one circuit and through a second and a third said groups of coils in series in another circuit for operating said motor at low speed, said switching means when actuated into a third position connect said groups of coils to said source so that said current flows in four parallel circuits each including one of said groups of coils, the direction of flow of said current being in said given direction in said first and second said groups and being in a reverse direction in said third and fourth said groups for operating said motor at high speed.

5. In combination, a two speed synchronous dynamoelectric machine comprising an armature and a field structure having polar projections provided with field coils to be connected to form alternately N or 2N magnetic poles, a source of excitation current for energizing said coils, said coils being divided into four groups, all the coils of each group interconnected to produce poles of the same polarity which are 360 electrical degrees apart with respect to said armature when said motor operates with N poles, four discharge resistors, switching means actuable into three positions, and means connecting said switching means to said source, said coils and at least five points of said resistors, whereby said switching means, when actuated into a first position, connect said resistors and said groups of coils in four circuits each comprising one of said resistors and one of said groups of coils in series for starting said motor, said switching means when actuated into a second position connect all said groups of coils in a series circuit to said source of excitation current so that said first and third said groups of coils provide north poles and said second and fourth said groups of coils provide south poles for operating said motor with 2N poles, and said switching means when actuated into a third position connect said coils to said source so that said first and second said groups of coils are connected in series in one circuit and said third and fourth said groups of coils are connected in series in another circuit, said first and fourth said groups of coils then providing north poles and said second and third said groups of coils then providing south poles for operating said motor with N poles.

6. In combination, a two speed synchronous dynamoelectric machine comprising an armature and a field structure having polar projections provided with a plurality of field coils to be connected to form a plurality of magnetic poles, a source of excitation current for energizing said coils, said coils being divided into four groups, all the coils of each group interconnected to produce poles of the same polarity which are 360 electrical degrees apart with respect to said armature when said motor operates at one said speed, a plurality of discharge resistors, switching means actuable into three positions, and means connecting said switching means to said source, said coils and said resistors, whereby said switching means, when actuated into a first position, connect said resistors and said groups of coils in a plurality of circuits each comprising one of said resistors and one of said groups of coils in series for starting said motor, said switching means when actuated into a second position connect said coils to said source of excitation current so that the direction of flow of said current in each said groups of coils is in one direction for operating said motor at a first one of said speeds, said switching means when actuated into a third position connect said groups of coils to said source of excitation so that the direction of flow of said current through two only of said groups of coils is reversed for operating said motor at the second of said speeds.

WILLIAM M. KITTSON,
*Executor of the Estate of Frank K. Brainard, Deceased.*

WILLIAM L. RINGLAND.

No references cited.